Feb. 20, 1962 R. B. GANDY 3,021,860
APPARATUS FOR SETTING IRRIGATION TUBES
Filed June 17, 1960 2 Sheets-Sheet 1
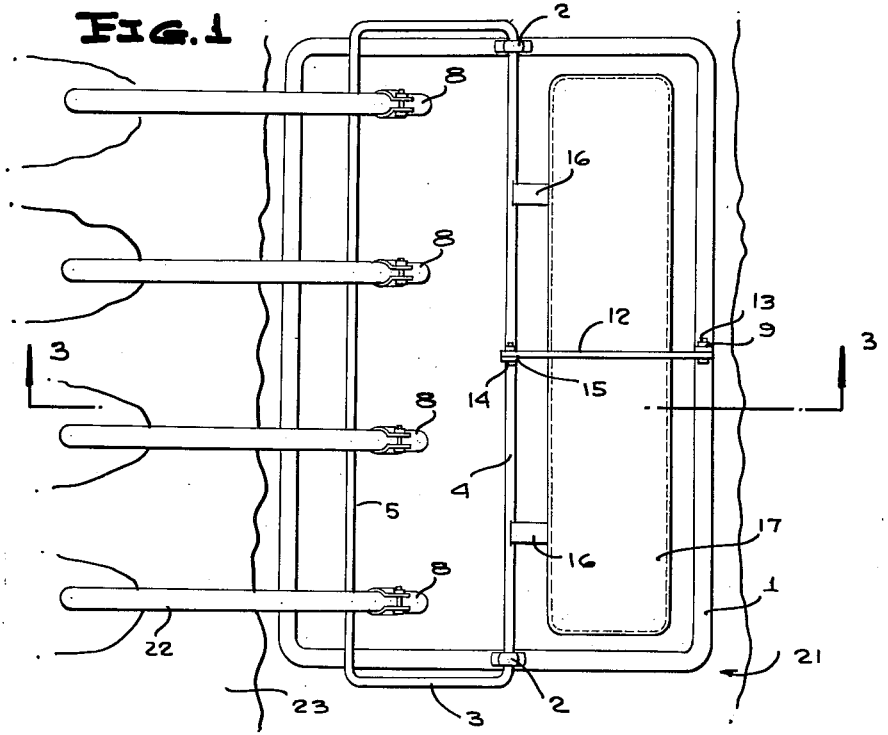
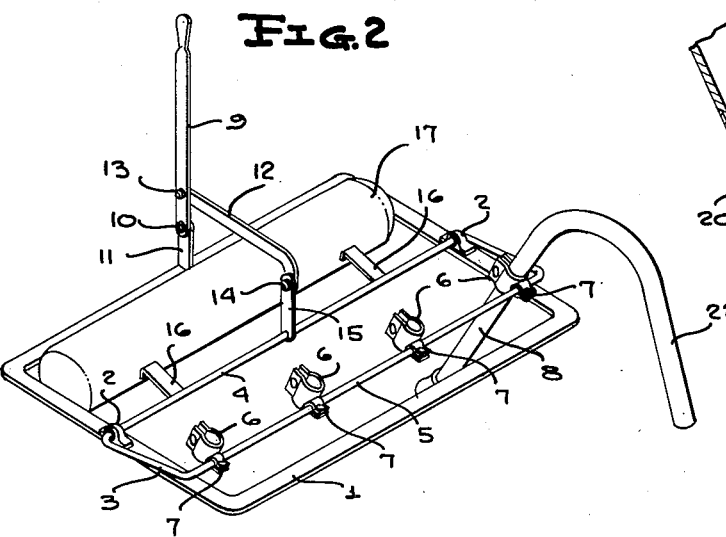
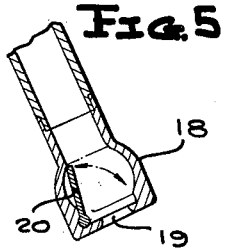
INVENTOR.
ROBERT B. GANDY
BY
McMorrow, Berman + Davidson
ATTORNEYS Feb. 20, 1962 R. B. GANDY 3,021,860
APPARATUS FOR SETTING IRRIGATION TUBES
Filed June 17, 1960 2 Sheets-Sheet 2
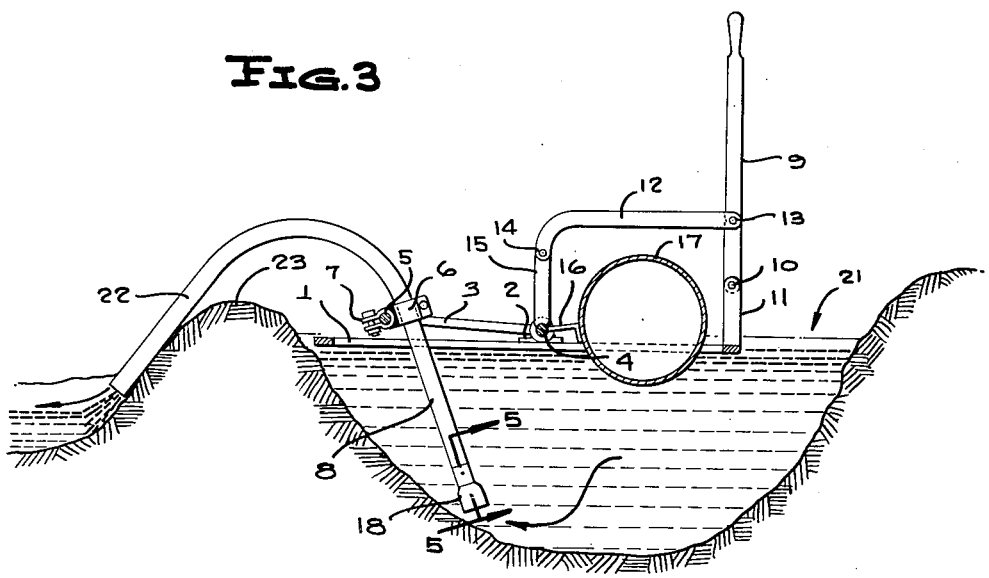
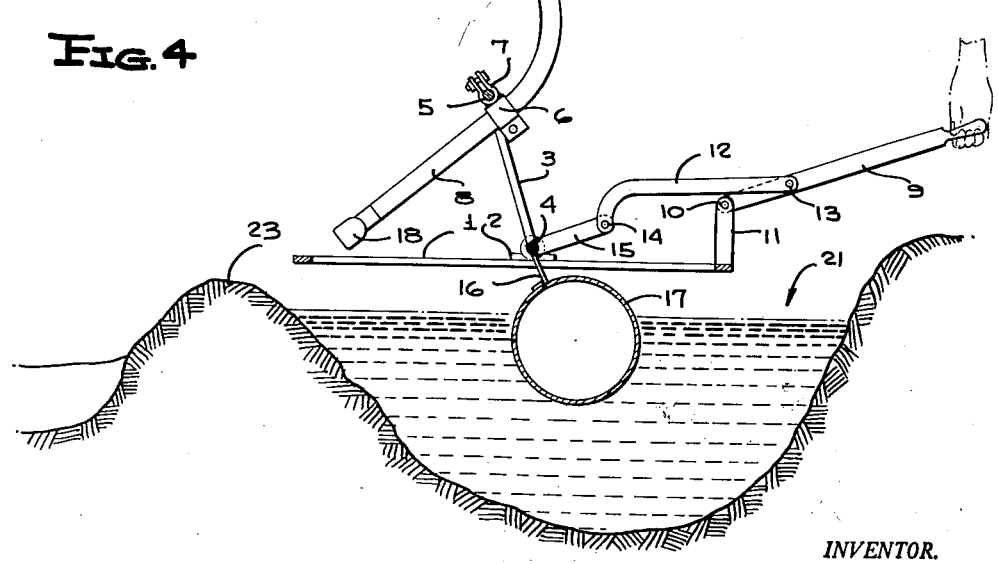
INVENTOR.
ROBERT B. GANDY
BY
McMorrow, Berman & Davidson
ATTORNEYS

3,021,860
APPARATUS FOR SETTING IRRIGATION TUBES
Robert B. Gandy, Idalou, Tex.
Filed June 17, 1960, Ser. No. 36,913
9 Claims. (Cl. 137—124)

This invention relates to portable siphons for irrigation ditch systems. In the usual practice the water is led from the main supply ditch or canal into the planted area by siphoning over the ditch bank, as for instance by means of aluminum or plastic tubes two to three inches in diameter and three to five feet in length, one being used for each crop row in an area to be watered. To start the process the operator immerses a tube in the ditch completely filling it with water, then closes one end, as with the open hand, hangs the tube over the ditch bank and removes his hand from the discharge end, whereupon flow commences, and continues until the tube is removed or the siphon otherwise broken.

It is an object of the present invention to avoid the need for repeated filling of the siphon tube. Other objects are to provide a siphon system of plural feed which is unitary in construction and readily portable from one location of use to another.

These and other objects which will be apparent to those skilled in the art are attained by the present invention which may be briefly described as a floatable frame having a linkage system for manipulating the tubes into and out of working position, and which includes valve means for maintaining the siphon tube filled when out of working position.

For a more detailed description of the invention reference is made to the following specification, as illustrated in the drawings, in which:

FIGURE 1 is a top plan view of the siphon-carrying frame,

FIGURE 2 is a perspective view of the frame shown in FIGURE 1, on reduced scale, FIGURE 3 is a sectional view taken on the line 3—3 of FIGURE 1 with parts of the system appearing in side elevation, FIGURE 4 is a view similar to FIGURE 3, showing the parts in an adjusted position with the siphon tubes raised from working position, and FIGURE 5 is a fragmentary view in section and enlarged showing the gate valve in the intake end of a tube, as seen along the line 5—5 of FIGURE 3.

Referring now to the drawings by characters of reference, there is shown a main supporting frame comprising a strip 1 forming an open rectangle, and which may be fabricated from any suitable material such as aluminum, steel, wood or plastic. A pair of pillow blocks 2 secured at the midpoints of respective, opposite ends of the frame 1 serve as bearings for a rocking system of rigid construction which carries the siphon tubes and the float. The tube-carrying portion of this system consists of a rectangular frame 3, conveniently formed from rod of round section, one side of which, indicated by the numeral 4 is journalled in the bearing blocks 2 and serves as the rocker shaft for the system. The outer swinging side 5 of frame 3 has affixed at spaced intervals along its length a series of hose clamps 6 with mounting tabs 7 in which clamps the intake arms 8 of the arcuately bent siphon tubes are secured.

Swinging of the siphon carriage 3 is effected by a hand lever 9 pivoted at 10 on an upright arm 11 carried at the midpoint of one of the sides of frame 1. Movement of the lever 9 is communicated to the frame or tube rack 3 by a link 12 pivoted to the lever at 13 above the pivot point 10, and pivoted at its inner end at 14 to an upwardly extending leg 15 rigidly secured to the rocker shaft 4.

Also secured to shaft 4 for rocking movement therewith are a pair of legs 16 to the outer ends of which is attached, by any suitable means, a float member 17. As shown, the float is a closed hollow cylinder of any suitable material such as metal or plastic, but which may have other forms and may comprise a solid mass of light or porous material.

As seen in FIGURE 5 the intake arm 8 of each siphon tube has a telescoping end piece 18 with opening 19 which houses a gate valve 20 hingedly carried within and positioned to close the opening 19 when the tube arm 8 is in a non-working position as in FIGURE 4.

In operation, the apparatus is spotted at the desired location along the ditch 21, and with the parts in the position shown in FIGURE 4, in which valve 20 is closed, the siphon tubes are filled with water by pouring into the end of the discharge arm 22. The tubes are then quickly lowered by movement of lever 9 to a position encompassing the bank 23 of the ditch and with the discharge ends of the tubes beneath the level of the water in ditch 21. In this position normal siphon flow commences, with gate valve 20 yielding to the flow. If desired the gate valve may have a slight spring bias to ensure its closing action but this bias must be considerably less than the pressure of the water head in the siphon.

In the working position of the apparatus the forward side of the main frame 1 may dwell on the side of the ditch, with the float serving to hold up the rear end and keep the intake end 18 of the tubes above the muck of the ditch bottom.

When it is desired to terminate water flow it is only necessary to pull back on the lever 9 which results in lifting the tubes and lowering the float to the positions shown in FIGURE 4, the water remaining in the tubes due to action of valve 20. In this position the system may be floated to a new location with little effort, and in FIGURE 4 the apparatus is shown balanced on the float 17 for this purpose. When it is out of service and not being moved the forward end of the frame 1 will rest against the ditch bank.

While a certain preferred embodiment has been shown and described, the invention is not limited thereby since various modifications and substitution of equivalents will suggest themselves to those skilled in the art, and the invention should not, therefore, be deemed as limited except as shall appear from the spirit and scope of the appended claims.

I claim:

1. A siphon system for irrigation ditches comprising an open rectangular, supporting frame, means on opposite ends of the frame journalling a rocker shaft medially of said frame, a rack secured to said shaft for swinging movement upon rotation of said shaft, a plurality of siphon tubes, means on said rack for securing said siphon tubes adjacent one of their respective ends at spaced points along the rack, a float unit, means rigidly connecting said float unit to said shaft in spaced relation on the side of said shaft opposite said rack, an arm secured to and extending from said shaft, a connecting link pivoted to said arm, and an operating handle pivoted to said frame and to said link.

2. A siphon system for irrigation ditches comprising a supporting platform, means on said platform journalling a rocker shaft medially of said platform, a rack secured to said shaft for swinging movement upon rotation of said shaft, a plurality of siphon tubes, means on said rack for attaching said siphon tubes adjacent one of their respective ends thereto, a float unit, means rigidly connecting said float unit to said shaft in spaced relation on the side of said shaft opposite said rack, a torque arm extending from said shaft, a connecting link pivoted to said arm, and an operating handle pivoted to said platform and said link, said platform having an opening passing passing said float unit.

3. A siphon system for irrigation ditches comprising a supporting platform, means on said platform journalling a rocker shaft medially of said platform, a rack secured to said shaft for swinging movement upon rotation of said shaft, a plurality of siphon tubes means on said rack for attaching said siphon tubes thereto adjacent one of their respective ends, a float unit, means rigidly connecting said float unit to said shaft in spaced relation on the side of said shaft opposite said rack, a torque arm extending from said shaft, and means on said platform for operating said torque arm, said platform having an opening for passage of said float.

4. A siphon system for irrigation ditches comprising a supporting frame, means on said frame journalling a rocker shaft medially of said frame, a rack secured to said shaft for swinging movement upon rotation of said shaft, a plurality of siphon tubes means on said rack for attaching said siphon tubes thereto adjacent one of their respective ends, a float unit, means rigidly connecting said float unit to said shaft in spaced relation on the side of said shaft opposite said rack, and cooperating means between the frame and the shaft for manual rotation of the shaft, said frame having an opening for passage of said float.

5. A siphon system for irrigation ditches comprising a supporting frame, means on said frame journalling a rocker shaft medially of said frame, means connected to said shaft for manually rotating said shaft, a rack secured to said shaft for swinging movement upon rotation of said shaft, a siphon tube, means on said rack for attaching said siphon tube thereto, a float unit, and means connecting said float unit to said shaft in spaced relation on the side of said shaft opposite said rack, said frame having an opening for passage of said float.

6. A siphon system for irrigation ditches comprising a supporting platform, a siphon tube, a rocker frame having a float on one end and an attaching rack for said siphon tube on the other end, means journalling said rocker frame on said platform along an axis intermediate said float and said rack, and means connected to said frame for manually rocking said frame relative to said platform, said platform having an opening for passage of said float.

7. A siphon system for irrigation ditches comprising a supporting platform, a plurality of siphon tubes, a rocker frame having a float on one end and an attaching rack for said siphon tubes on the other end, means journalling said rocker frame on said platform along an axis intermediate said float and said rack, and means connected to said rack for manually rocking said frame on said platform.

8. A siphon system for irrigation ditches comprising a supporting platform, a plurality of siphon tubes, a rocker frame having a float on one end and an attaching rack for said siphon tubes on the other end, means journalling said rocker frame for pivotal movement on said platform along an axis intermediate said float and said rack, and means connected to said rack for manually pivoting the same on said platform.

9. A siphon system for irrigation ditches comprising a supporting platform, a rocker frame having a float on one end and a rack on the other end, a bent siphon tube attached to said rack, a gate valve in one end of said tube, means journalling said rocker frame for rotation on said platform along an axis intermediate said float and said rack, and means connected to said rocker frame to manually rotate the same.

References Cited in the file of this patent

UNITED STATES PATENTS

| | | |
|---|---|---|
| 84,384 | Sherwood | Nov. 24, 1868 |
| 2,790,455 | Dorsey et al. | Apr. 30, 1957 |
| 2,927,596 | Carlson | Mar. 8, 1960 |

FOREIGN PATENTS

| | | |
|---|---|---|
| 9,392 | Great Britain | Apr. 30, 1908 |